United States Patent
Fleytman

(10) Patent No.: US 7,695,389 B2
(45) Date of Patent: Apr. 13, 2010

(54) CONDUCTIVE POLYMER DRIVE FOR ACTUATING ECCENTRIC MEMBERS OF A MOTOR

(75) Inventor: Yakov Fleytman, Flowery Branch, GA (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 474 days.

(21) Appl. No.: 11/798,551

(22) Filed: May 15, 2007

(65) Prior Publication Data

US 2008/0001499 A1     Jan. 3, 2008

Related U.S. Application Data

(60) Provisional application No. 60/811,438, filed on Jun. 7, 2006.

(51) Int. Cl.
     *F16H 3/70*      (2006.01)
(52) U.S. Cl. ............... 475/178; 310/328; 310/800
(58) Field of Classification Search ............. 310/800; 475/162, 178
See application file for complete search history.

(56) References Cited

U.S. PATENT DOCUMENTS

| | | | |
|---|---|---|---|
| 162,042 A | 4/1875 | DeMestre |
| 200,238 A | 2/1878 | Alker |
| 200,984 A | 3/1878 | Curtis |
| 488,851 A | 12/1892 | Stock |
| 2,750,807 A | 6/1956 | Miyazaki |
| 3,345,883 A | 10/1967 | Glocker |
| 3,558,944 A | 1/1971 | Verge |
| 3,577,049 A | 5/1971 | Madurski et al. |
| 3,770,997 A | 11/1973 | Presley |
| 4,210,837 A | 7/1980 | Vasiliev |
| 4,412,794 A | 11/1983 | Presley |
| 4,782,262 A | 11/1988 | Kiyo-Oka |
| 4,837,470 A | 6/1989 | Tamura |
| 4,954,735 A | 9/1990 | Parsons |
| 4,998,379 A | 3/1991 | Yamada et al. |
| 5,041,753 A | 8/1991 | Clark et al. |
| 5,079,471 A | 1/1992 | Nygren, Jr. |
| 5,237,234 A | 8/1993 | Jebens et al. |
| 5,250,167 A | 10/1993 | Adolf et al. |
| 5,268,082 A | 12/1993 | Oguro et al. |
| 5,324,240 A | 6/1994 | Guttinger |
| 5,378,948 A * | 1/1995 | Richter ............ 310/328 |
| 5,556,700 A | 9/1996 | Kaneto et al. |
| 5,770,913 A | 6/1998 | Mizzi |
| 5,977,685 A | 11/1999 | Kurita et al. |

(Continued)

*Primary Examiner*—Sherry Estremsky
(74) *Attorney, Agent, or Firm*—Manelli Denison & Selter PLLC; Edward J. Stemberger

(57) ABSTRACT

A gear drive assembly (33) includes a housing (24), an external base (28) movable with respect to the housing, and an external gear member (12) associated with the external base. The assembly includes an internal gear member (14) surrounded by the external gear member and in meshing relation therewith. The assembly also includes a plurality of conductive polymer actuators (26) defining actuator sets. Each actuator set is coupled at one portion thereof to the housing with another portion thereof being coupled to the external base. Each actuator is constructed and arranged to deflect when voltage is applied thereto such that when voltage is selectively applied to the actuator sets, deflection of the actuators causes the external base to move causing the external gear member to move in an orbiting manner with respect to the internal gear member.

18 Claims, 5 Drawing Sheets

U.S. PATENT DOCUMENTS

| | | | |
|---|---|---|---|
| 5,985,145 A * | 11/1999 | McEwen | 210/295 |
| 6,060,811 A | 5/2000 | Fox et al. | |
| 6,084,321 A | 7/2000 | Hunter et al. | |
| 6,109,852 A | 8/2000 | Shahinpoor et al. | |
| 6,249,076 B1 | 6/2001 | Madden et al. | |
| 6,280,359 B1 | 8/2001 | Moskob | |
| 6,376,968 B1 * | 4/2002 | Taylor et al. | 310/339 |
| 6,441,536 B2 | 8/2002 | Fischer et al. | |
| 6,453,772 B1 | 9/2002 | Moskob | |
| 6,475,639 B2 | 11/2002 | Shahinpoor et al. | |
| 6,491,601 B1 | 12/2002 | Moskob | |
| 6,545,384 B1 | 4/2003 | Pelrine et al. | |
| 6,577,039 B2 | 6/2003 | Ishida et al. | |
| 6,583,533 B2 | 6/2003 | Perlrine et al. | |
| 6,586,859 B2 | 7/2003 | Kornbluh et al. | |
| 6,628,040 B2 | 9/2003 | Pelrine et al. | |
| 6,664,710 B1 | 12/2003 | Gottlieb et al. | |
| 6,664,711 B2 * | 12/2003 | Baudendistel | 310/323.02 |
| 6,664,718 B2 | 12/2003 | Pelrine et al. | |
| 6,685,442 B2 | 2/2004 | Chinn et al. | |
| 6,762,210 B1 | 7/2004 | Oguro et al. | |
| 6,768,246 B2 | 7/2004 | Pelrine et al. | |
| 6,781,284 B1 | 8/2004 | Pelrine et al. | |
| 6,806,621 B2 | 10/2004 | Heim et al. | |
| 6,812,624 B1 | 11/2004 | Pei et al. | |
| 6,911,764 B2 | 6/2005 | Pelrine et al. | |
| 6,972,659 B2 | 12/2005 | Von Behrens et al. | |
| 7,071,596 B2 * | 7/2006 | Krill | 310/328 |
| 7,075,213 B2 * | 7/2006 | Krill | 310/328 |
| 7,326,143 B2 * | 2/2008 | Kimura et al. | 475/162 |
| 7,456,549 B2 * | 11/2008 | Heim et al. | 310/328 |
| 2001/0038258 A1 * | 11/2001 | Fischer et al. | 310/328 |

* cited by examiner

CONDUCTIVE POLYMER DRIVE FOR ACTUATING ECCENTRIC MEMBERS OF A MOTOR This application claims the benefit of the earlier filing date of U.S. Provisional Application No. 60/811,438, filed on Jun. 7, 2006, which is incorporated by reference herein in its entirety.

FIELD OF THE INVENTION

The present invention relates to motors and, more particularly, to a conductive polymer used as an actuator for moving eccentric members of a window lift motor.

BACKGROUND OF THE INVENTION

With reference to FIGS. 1-3, a conventional eccentric gear assembly, shown generally indicated at 10, is typically used in motors for window lift drive systems of vehicles for moving a window upwardly and downwardly. The eccentric gear assembly 10 includes an external gear or drive member 12 and a meshing internal gear or shaft member 14.

To move the drive member 12, a base member 16 is coupled with the drive member 12. FIGS. 2a-2d show that by sequentially moving the base member 16 in the X and Y directions by electro-mechanical actuators 18, the base member 16 will move in an orbiting manner (e.g., have circular displacement). U.S. Pat. No. 6,441,536 and U.S. Pat. No. 6,664,710 show motors employing electro-mechanical actuators to move such a drive member that surrounds a shaft member. Orbiting movement of the base member 12 generates rotational motion of the eccentric gear assembly 10.

FIGS. 3a to 3d represent in plan view instantaneous pictures for various phase angles (wt) of the shaft member 14 and the drive member 12 of the conventional eccentric gear assembly 10: (ωt)=0° and 360° in FIG. 3a, (ωt)=90° in FIG. 3b, (ωt)=180° in FIG. 3c, and (ωt)=270° in FIG. 3d. The arrows indicate the instantaneous direction of movement, that is to say the direction of the velocity vectors of the shaft member 14 and drive member 12. The angle $\Phi_k$ of the point $P_k$ perpendicular to the longitudinal axis at which the shaft member 14 is instantaneously in contact with the drive member 14 ("contact point") is yielded in accordance with: $\Phi_k = -\omega^* t$.

Conventional, grounded leading pins 20 can be optionally employed to control (limit) amplitude of orbiting movement of the eccentric gear assembly 10.

There is a need to be able to cause motion of an eccentric gear assembly without using conventional electro-mechanical actuators.

SUMMARY OF THE INVENTION

An object of the invention is to fulfill the need referred to above. In accordance with the principles of the present invention, a gear drive assembly includes a housing; an external base movable with respect to the housing; and an external gear member associated with the external base. The external gear member has internal gear teeth. The assembly includes an internal gear member surrounded by the external gear member and having external gear teeth. The external gear teeth are constructed and arranged to mesh with the internal gear teeth. The assembly also includes a plurality of conductive polymer actuators defining actuator sets. Each actuator set is coupled at one portion thereof to the housing with another portion thereof being coupled to the external base. Each actuator is constructed and arranged to deflect when voltage is applied thereto such that when voltage is selectively applied to the actuator sets, deflection of the actuators causes the external base to move causing the external gear member to move in an orbiting manner with respect to the internal gear member.

In accordance with another aspect of the invention, a drive assembly is provided for moving eccentric members of a motor. The eccentric members include an external member and a cooperating internal member surrounded by the external member. The drive assembly includes a housing; an external base constructed and arranged to be associated with external member; and a plurality of conductive polymer actuators defining actuator sets. Each actuator set is coupled at one portion thereof to the housing with another portion thereof being coupled to the external base. Each actuator is constructed and arranged to deflect when voltage is applied thereto such that when voltage is selectively applied to the actuator sets, deflection of the actuators causes the external base to move with respect to the housing. The drive assembly can be employed to drive the external member with respect to the internal member.

In accordance with yet another aspect of the invention, a method of causing an external gear member to move about an internal gear member provides a housing; an external base movable with respect to the housing; an external gear member associated with the external base, an internal gear member surrounded by the external gear member and operatively associated therewith; and a plurality of conductive polymer actuators coupled between the housing and the external base. Voltage is applied to the actuators causing the actuators to deflect and thereby cause the external base to move causing the external gear member to move in an orbiting manner with respect to the internal gear.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

There is a need to be able to cause motion of an eccentric gear assembly without using the conventional, numerous and expensive electro-mechanical actuators, such as the type shown in FIG. 2.

Accordingly, if a planar film of an elastomeric polymer with dielectric properties is coated on its opposing sides with a compliant thin film of conducting material, it becomes a variable capacitor device that changes shape when voltage is applied. One such device is disclosed in U.S. Pat. No. 6,583, 533, the content of which is hereby incorporated by reference into this specification. A variety of polymer materials may be used for such devices, depending on the desired performance and operating conditions. When a voltage is applied to the electrodes, the Maxwell stress from the static charge on each electrode film compresses the dielectric elastic polymer in thickness. In addition, the repulsive forces resulting from the like charges on each electrode act to increase the area of the structure. Because the polymer sandwiched between the electrode films acts as an incompressible fluid, the volume of the film tends to remain constant when a force is applied in one dimension. As the force from the electrode films causes the thin film to get thinner (decreasing in the Z dimension), the X and Y dimensions increase to maintain a constant volume. Thus, electrical energy is converted into mechanical motion.

The properties of the above-mentioned electro-active polymer device include high energy and power density, high energy conversion efficiency, quiet operation, simple fabrication with few parts and low-cost component material compared to traditional electric motors. The performance of electro-active polymer systems exceeds that of electromagnetic technology.

Figure 1:
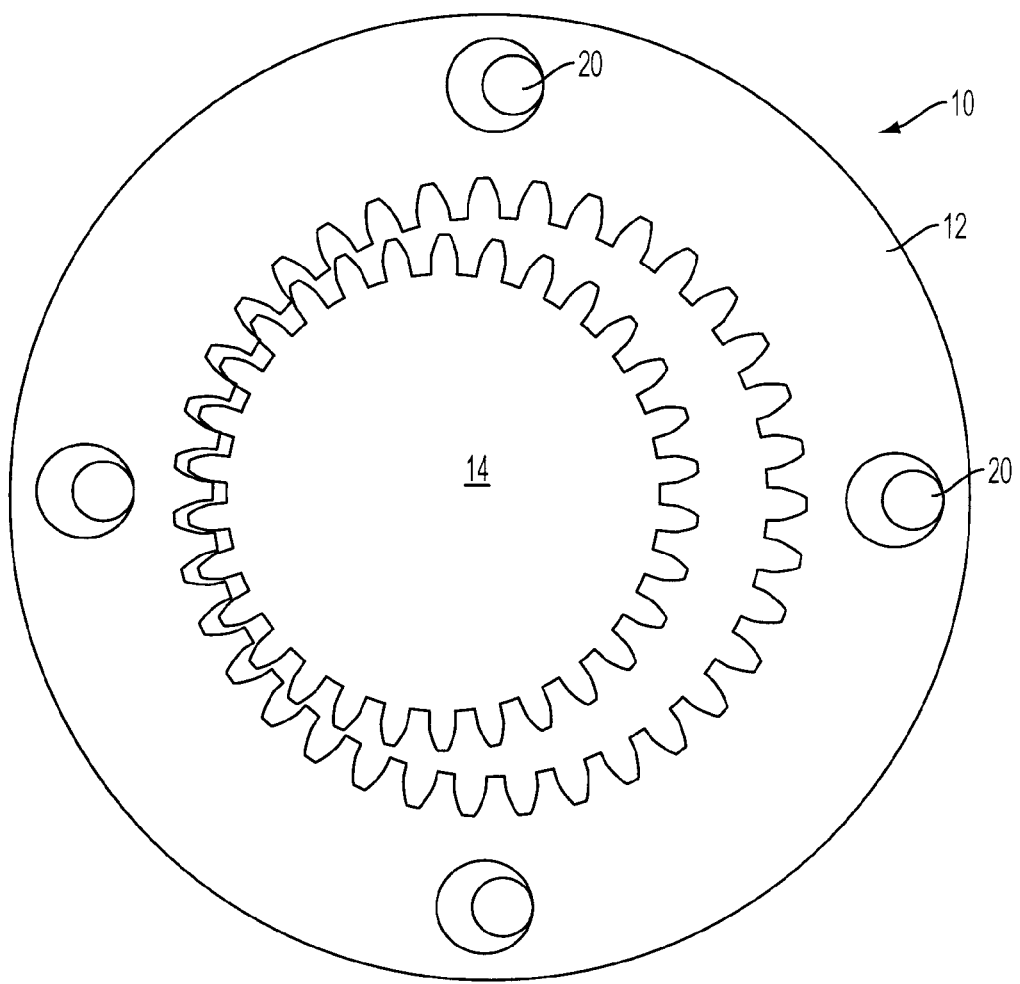
FIG. 1 is a view of conventional eccentric gear assembly for use in a motor.
Figure 2A:
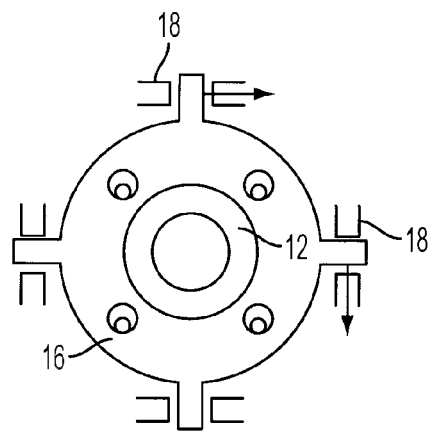
FIGS. 2a-2d show conventional movement of an external gear base, of an eccentric gear assembly, by actuators.
Figure 2B:
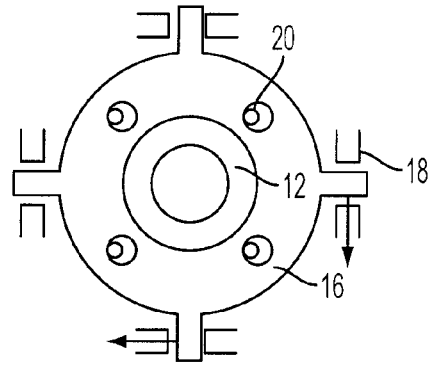
Figure 2C:
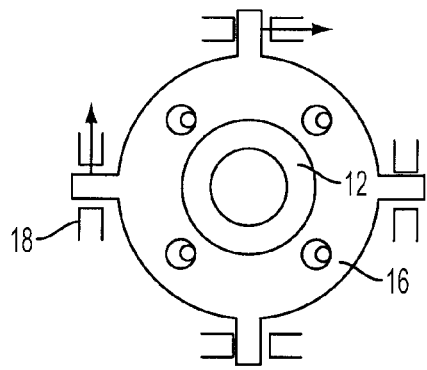
Figure 2D:
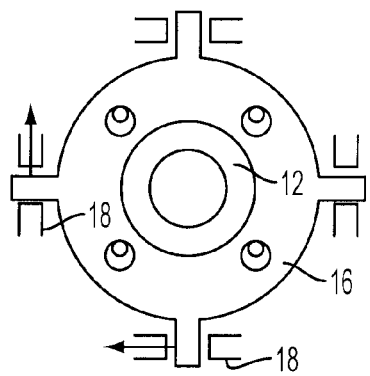
Figure 3A:
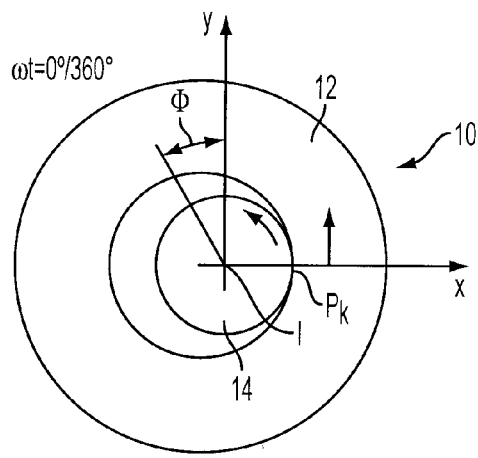
FIGS. 3a-3d show the phases of motion of a conventional eccentric gear.
Figure 3B:
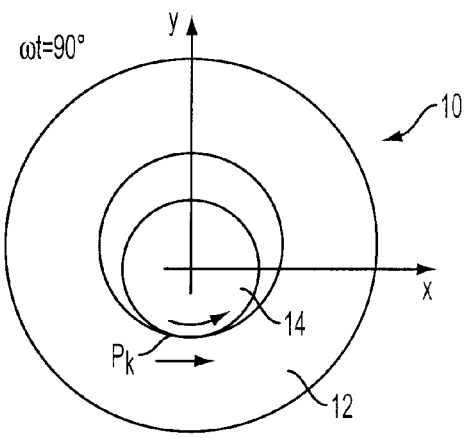
Figure 3C:
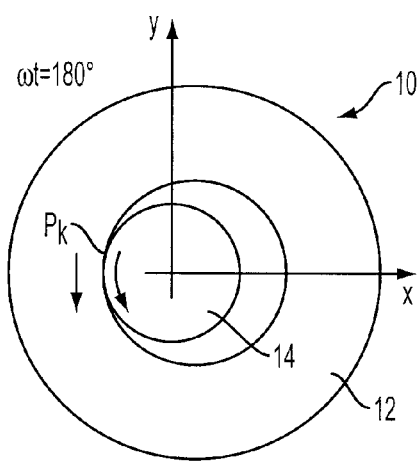
Figure 3D:
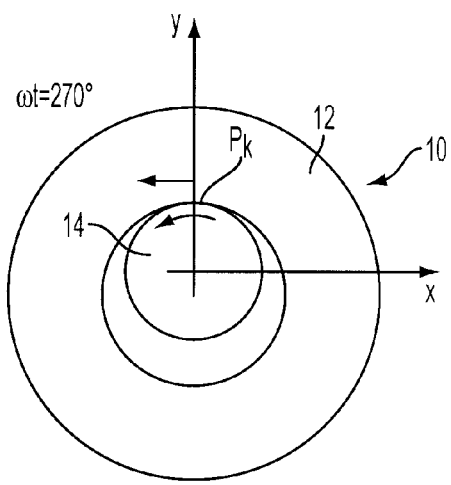
Figure 4:
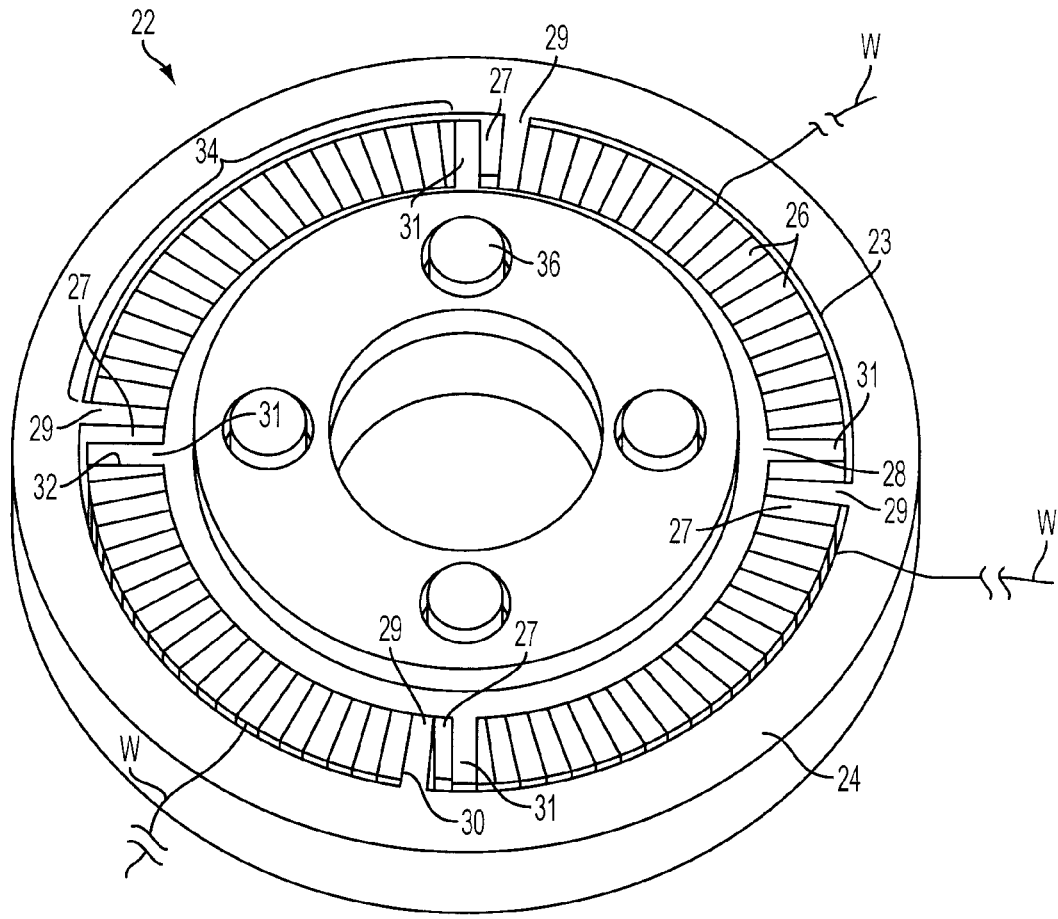
FIG. 4 is an enlarged view of a conductive polymer drive assembly in accordance with the principles of an embodiment of the present invention.

Thus, employing the above principles and with reference to FIG. 4, a conductive polymer drive assembly is shown, generally indicated at 22, in accordance with an embodiment of the present invention. The drive assembly 22 includes a housing 24 and a plurality of conductive polymer actuators or piezoelectric elements 26 and an external gear base 28. The housing 24 has surface defining a generally annular opening 23. The actuators are disposed in the opening 23. The actuators 26 preferably of the type disclosed in U.S. Pat. No. 6,583,533, constructed and arranged to change shape or deflect when voltage is applied. The actuators 26 form a generally annular shape between the housing and the external gear base 28. Thus, the actuators 26 form sector bars around an axis of an eccentric gear assembly. In the embodiment, the actuators 26 are attached to each other to define arc-shaped sets 34 of conductive polymer members or piezoelectric elements. Four sets 34 are shown. One end 30 of each set 34 is attached to the housing 24 (via tab 29 extending into opening 23) and the other end 32 is attached to the external gear base 28 (via tab 31). A space 27 is associated with each set 34 of actuators 26 to accommodate deflection of the actuators 26 as will be explained below.

Figure 5:
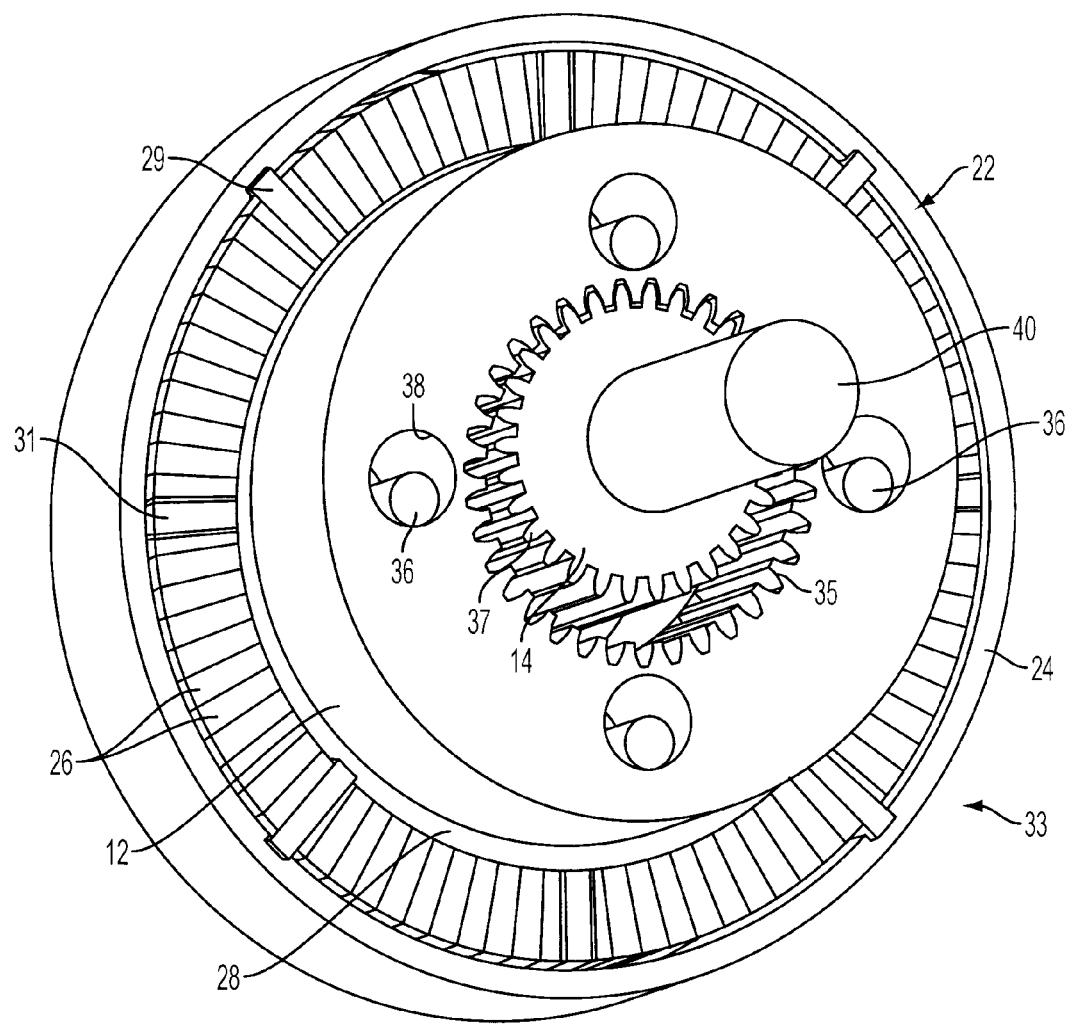
FIG. 5 is a view of the drive assembly of FIG. 4 driving an eccentric gear assembly.

The base 28 is movable with respect to the housing 24 and is associated with the external gear or member 12 (FIG. 5) via leading pins 36. Drive member or external gear 12 has internal gear teeth 35 that mesh with external teeth 37 of the internal gear 14 in the conventional manner. The drive assembly 22, together with the external gear 12 and the internal gear 14 define a gear drive assembly, generally indicated at 33. Hence, selectively energizing the sets 34 of actuators 26 (e.g., applying voltage via wires W) causes orbital motion of the external gear base 28 and the attached leading pins 36 which produces motion of the external gear 12 similar to that of FIG. 2a-2d, but without using the mechanical actuators 22. This causes the internal gear and thus shaft 40 coupled thereto to rotate. The leading pins 36 also help to limit displacements, and can be of the type disclosed in U.S. Pat. No. 5,324,240, or U.S. Pat. No. 1,089,181, the content of each of these patents is hereby incorporated by reference into this specification. In the embodiment, the leading pins 36 are disposed in opening 38 that are larger than the diameter of the pins 36. The pins 36 are used to transfer motion of the gear base 28 to the external gear 12 or can be driven to directly move the external gear 12, thus providing driving orbital motion especially when the source of motion cannot be controlled by an X-Y displacement.

The leading pins are optional, since the external member 12 can be driven by the actuators 26 to move the external gear 12.

The location of the leading pins 36 can be generally centered with respect each set 34 of actuators 26 or, as shown in FIG. 4, can be angular varying to be generally adjacent to the ends of the sets 34 of actuators 26.

The internal gear 14 is coupled with a shaft 40 so that the drive assembly 22 (FIG. 4) and thus the gear drive assembly 33 (FIG. 5) are useful in vehicle window lift motors. However, the gear assembly 33 can be used in vehicle power seat motors and in non-automotive electric motors. The use of the actuators 26 reduces cost of the drive assembly 22 since no conventional electro-mechanical actuators are required.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A drive assembly for moving eccentric members of a motor, the eccentric members including an external member and a cooperating internal member surrounded by the external member, the drive assembly comprising:
   a housing,
   an external base constructed and arranged to be associated with the external member, and
   a plurality of conductive polymer actuators defining actuator sets, each actuator set being coupled at one portion thereof to the housing with another portion thereof being coupled to the external base, each actuator being constructed and arranged to deflect when voltage is applied thereto such that when voltage is selectively applied to the actuator sets, deflection of the actuators causes the external base to move with respect to the housing.

2. The drive assembly of claim 1, wherein each actuator set is of generally arc shape and together the sets define a generally annular shape between the housing and the external base.

3. The drive assembly of claim 1, in combination with the external member, the external member being associated with the external base such that movement of the base moves the external member.

4. A gear drive assembly comprising:
   a housing,
   an external base movable with respect to the housing,
   an external gear member associated with the external base, the external gear member having internal gear teeth,
   an internal gear member surrounded by the external gear member and having external gear teeth, the external gear teeth being constructed and arranged to mesh with the internal gear teeth, and
   a plurality of conductive polymer actuators defining actuator sets, each actuator set being coupled at one portion thereof to the housing with another portion thereof being coupled to the external base, each actuator being constructed and arranged to deflect when voltage is applied thereto such that when voltage is selectively applied to the actuator sets, deflection of the actuators causes the external base to move causing the external gear member to move in an orbiting manner with respect to the internal gear member.

5. The gear drive assembly of claim 4, wherein each actuator set is of generally arc shape and together the actuator sets define a generally annular shape between the housing and the external base.

6. The gear drive assembly of claim 5, wherein four actuator sets are provided.

7. The gear drive assembly of claim 6, further including a plurality of leading pins coupled to the external base, the external gear member having surfaces defining openings, each opening receiving an associated leading pin, each opening being larger than a diameter of the leading pin, the leading pins transferring motion of the external base to the external gear member upon engaging the surfaces defining the openings.

8. The gear drive assembly of claim 7, wherein four evenly spaced leading pins are provided with each pin being generally adjacent to an end of an associated actuator set.

9. The gear drive assembly of claim 5, wherein the housing has surfaces defining a generally annular opening, the actuator sets being disposed in the opening.

10. The gear drive assembly of claim 9, wherein the housing includes tabs extending into the opening, the one portion of each actuator set being coupled to an associated tab.

11. The gear drive assembly of claim 9, wherein the external base includes a plurality of tabs, the another portion of each actuator set being coupled to an associated tab of the external base.

12. The gear drive assembly of claim 4, wherein the internal gear member is coupled with a shaft.

13. The gear drive assembly of claim 4, further including a plurality of leading pins coupled to the external base, the external gear member having surfaces defining openings, each opening receiving an associated leading pin, each opening being larger than a diameter of the leading pin, the leading pins transferring motion of the external base to the external gear member upon engaging the surfaces defining the openings.

14. The gear drive assembly of claim 13, wherein four evenly spaced leading pins are provided.

15. A method of causing an external gear member to move about an internal gear member, the method comprising:
    providing a housing; an external base movable with respect to the housing; an external gear member associated with the external base, an internal gear member surrounded by the external gear member and operatively associated therewith; and a plurality of conductive polymer actuators coupled between the housing and the external base, and
    applying voltage to the actuators causing the actuators to deflect and thereby causing the external base to move causing the external gear member to move in an orbiting manner with respect to the internal gear.

16. The method of claim 15, wherein the actuators define actuator sets and each actuator set is of generally arc shape and together the actuator sets define a generally annular shape between the housing and the external base, the method including:
    applying voltage to the actuator sets causing the actuator of the set to deflect.

17. The method of claim 15, further providing a plurality of leading pins coupled to the external base, the external gear member having surfaces defining openings, each opening receiving an associated leading pin, each opening being larger than a diameter of the leading pin, the method including:
    transferring motion of the external base to the external gear member by the leading pins upon the leading pins engaging the surfaces defining the openings.

18. The method of claim 17, wherein four evenly spaced leading pins are provided.

* * * * *